US012699921B2

(12) United States Patent
Hsing et al.

(10) Patent No.: US 12,699,921 B2
(45) Date of Patent: Aug. 4, 2026

(54) SYSTEMS AND METHODS OF APPLYING MATRIX PRODUCT STATES TO MACHINE LEARNING

(71) Applicant: Multiverse Computing SL, San Sebastián (ES)

(72) Inventors: Chia-Wei Hsing, San Sebastián (ES); Román Orús, San Sebastián (ES); Samuel Mugel, Toronto (CA); Saeed Jahromi, San Sebastián (ES); Serkan Sahin, Munich (DE); Samuel Palmer, Toronto (CA)

(73) Assignee: MULTIVERSE COMPUTING SL, San Sebastián (ES)

( * ) Notice: Subject to any disclaimer, the term of this patent is extended or adjusted under 35 U.S.C. 154(b) by 937 days.

(21) Appl. No.: 17/857,487

(22) Filed: Jul. 5, 2022

(65) Prior Publication Data

US 2023/0409961 A1 Dec. 21, 2023

(30) Foreign Application Priority Data

Jun. 15, 2022 (EP) ..................................... 22382570

(51) Int. Cl.
G06N 20/00 (2019.01)
(52) U.S. Cl.
CPC ..................................... G06N 20/00 (2019.01)
(58) Field of Classification Search
CPC combination set(s) only.
See application file for complete search history.

(56) References Cited

U.S. PATENT DOCUMENTS

2022/0269751 A1* 8/2022 Mugel .................... G06N 10/00
2022/0383177 A1* 12/2022 Alcazar .................. G06N 10/40
(Continued)

OTHER PUBLICATIONS

Stoudenmire, E. M. and Schwab, D. J., "Supervised Learning With Quantum-Inspired Tensor Networks," Advances in Neural Information Processing Systems 29, 4799 (2016), pp. 1-12.
(Continued)

*Primary Examiner* — Asher D Kells
(74) *Attorney, Agent, or Firm* — Rothwell, Figg, Ernst & Manbeck, P.C.

(57) ABSTRACT

A method of applying non-linear regression on a set of data points to get an estimate is described herein. The method includes receiving a set of N datapoints, separating the set of N datapoints into $N_b$ batches, receiving a family of fitting functions, and minimizing a log-cosh cost function for each batch by selecting parameters that minimize the log-cosh cost function. The parameters are obtained by: receiving a matrix product state (MPS) model and training the MPS to minimize loss over all the $N_b$ batches, including choosing an MPS with M+D tensors. All tensors except D correspond to one datapoint in each of the $N_b$ batches, D extra tensors in the MPS have a physical dimension of size M corresponding to the number of possible outputs for a given batch, and the coefficients of the tensors in the MPS minimize the log-cosh cost function sequentially over all the $N_b$ batches.

20 Claims, 15 Drawing Sheets

(56) References Cited

U.S. PATENT DOCUMENTS

| | | | |
|---|---|---|---|
| 2023/0401262 A1* | 12/2023 | Orús Lacort | G06N 10/60 |
| 2023/0409665 A1* | 12/2023 | Palmer | G06F 17/16 |
| 2024/0062096 A1* | 2/2024 | Farquhar | G06N 10/80 |
| 2024/0160689 A1* | 5/2024 | Sun | G06F 15/78 |

OTHER PUBLICATIONS

Efthymiou, S., et al., "TensorNetwork for Machine Learning," (2019), pp. 1-9.

* cited by examiner

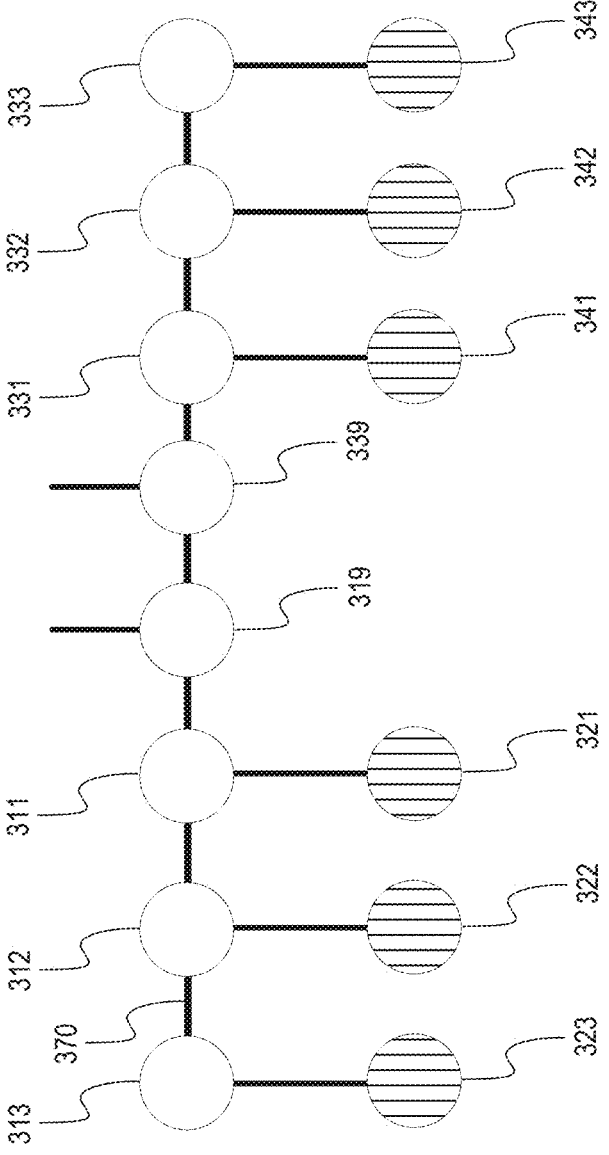
FIG. 3

400

[y, 1-y]

443

442

441

433

432

431

439

459

451

470

452

453

419

421

411

422

412

423

413

[x, 1-x]

461

462

463

[z, 1-z]

SYSTEMS AND METHODS OF APPLYING MATRIX PRODUCT STATES TO MACHINE LEARNING

CROSS REFERENCE TO RELATED APPLICATION(S)

This application claims priority to European Patent Application No. 22382570.4, filed Jun. 15, 2022, the disclosure of which is incorporated herein in its entirety by reference, and priority is claimed to the foregoing.

FIELD

Various embodiments are described herein that generally relate to a system for applying matrix product states to machine learning, as well as the methods.

BACKGROUND

The following paragraphs are provided by way of background to the present disclosure. They are not, however, an admission that anything discussed therein is prior art or part of the knowledge of persons skilled in the art.

There currently are a number of machine learning (ML) architectures capable of performing tasks such as classification and generative modeling. Future values can be predicted with the help of regression algorithms in ML. For example, input data and/or historical data can be used to predict a wide range of future values using regression. Suppose a label in ML is defined as the target variable (to be predicted), regression can help in defining the relationship between the label and data points. Regression is a type of supervised learning in ML that helps in mapping a predictive relationship between labels and data points. Examples of regression algorithms in ML include linear regression, decision tree regression, random forest, support vector machines (SVM), K Nearest Neighbor (KNN), and neural network regression. However, performance of some of these regression algorithms can be suboptimal or use computer resources inefficiently.

Ordinary Differential Equations (ODEs) are well-understood tools for the mathematical analysis of scientific knowledge, and they are fundamental building blocks for mathematical models in engineering, finance, and the natural sciences. ODEs have also been used as mathematical models of the neural architectures and training algorithms arising in machine learning. ODEs can be approximated by machine learning, for example, using a neural network that minimizes a loss function. However, performance of a neural network can be suboptimal or use computer resources inefficiently.

There is a need for a system and method that addresses the challenges and/or shortcomings described.

SUMMARY OF VARIOUS EMBODIMENTS

Various embodiments of a system and method of applying matrix product states to machine learning, and computer products for use therewith, are provided according to the teachings herein.

According to one aspect of the invention, there is disclosed a system for applying non-linear regression on a set of data points to get an estimate. The system comprises at least one processor configured to: receive a set of N datapoints, each of the datapoints having associated input values; separate the set of N datapoints into $N_b$ batches, each of the $N_b$ batches having $M=N/N_b$ datapoints; receive a family of fitting functions, each function comprising a dot product of a feature map $\Phi$ with a weight vector W, where the feature map $\Phi$ is local and represented by two-dimensional feature vectors; and minimize a cost function for each batch $\alpha$ by selecting parameters for the functions that minimize the cost function. The parameters are obtained by: receiving a matrix product state (MPS) model providing an MPS representation of the weight vector W, the MPS model comprising weight tensors; and training the MPS to minimize loss over all the $N_b$ batches, the training comprising choosing an MPS with M+D tensors, where D corresponds to a dimension of a target function. Each of the tensors have respective coefficients, such that: all tensors except D correspond to one datapoint i in each of the $N_b$ batches; D extra tensors in the MPS have a physical dimension of size M corresponding to a number of possible outputs for a given batch from the $N_b$ batches; and the coefficients of the tensors in the MPS minimize the cost function sequentially over all the $N_b$ batches.

In at least one embodiment, the at least one processor is further configured to: decompose the weight vector W using tensor network support vector regression to obtain the weight tensors.

In at least one embodiment, the at least one processor is configured to train the MPS to minimize loss over all the $N_b$ batches by sweeping the MPS and optimizing the coefficients of the tensors until a convergence criterion is satisfied.

In at least one embodiment, the at least one processor is configured to optimize the coefficients of the tensors using one of: auto-differentiation and back propagation, density matrix renormalization group (DMRG) variational sweep, or tangent space variational optimization.

In at least one embodiment, the feature map $\Phi$ is represented by D sets of two-dimensional feature vectors, the MPS is represented by D wings of tensors, and each wing is associated with one set of two-dimensional feature vectors.

In at least one embodiment, the D extra tensors in the MPS having a physical dimension of size M are central tensors in the MPS.

In at least one embodiment, each fitting function is determined using tensor network support vector regression.

In at least one embodiment, each fitting function is determined using support vector regression (SVR) in combination with tensor network (TN) decompositions.

In at least one embodiment, the at least one processor is further configured to: flatten the MPS model by cutting a virtual bond between neighboring tensors.

In at least one embodiment, the cost function is a log-cosh cost function.

According to another aspect of the invention, there is disclosed a computer-implemented method of applying non-linear regression on a set of data points to get an estimate. The method comprises: receiving a set of N datapoints, each of the datapoints having associated input values; separating the set of N datapoints into $N_b$ batches, each of the $N_b$ batches having $M=N/N_b$ datapoints; receiving a family of fitting functions, each function comprising a dot product of a feature map $\Phi$ with a weight vector W, where the feature map $\Phi$ is local and represented by two-dimensional feature vectors; and minimizing a cost function for each batch $\alpha$ by selecting parameters for the functions that minimize the cost function. The parameters are obtained by; receiving a matrix product state (MPS) model providing an MPS representation of the weight vector W, the MPS model comprising weight tensors; and training the MPS model to minimize loss over all the $N_b$ batches, the training comprising choosing an MPS with M+D tensors, where D corresponds to a dimension of a target function. Each of the tensors have respective coefficients, such that; all tensors except D correspond to one datapoint i in each of the $N_b$ batches; D extra tensors in the MPS have a physical dimension of size M corresponding to a number of possible outputs for a given batch from the $N_b$ batches; and the coefficients of the tensors in the MPS minimize the cost function sequentially over all the $N_b$ batches.

In at least one embodiment, the method further comprises decomposing the weight vector W using tensor network support vector regression to obtain the weight tensors.

In at least one embodiment, training the MPS to minimize loss over all the $N_b$ batches comprises sweeping the MPS and optimizing the coefficients of the tensors until a convergence criterion is satisfied.

In at least one embodiment, the coefficients of the tensors are optimized using one of: auto-differentiation and back propagation, density matrix renormalization group (DMRG) variational sweep, or tangent space variational optimization.

In at least one embodiment, the feature map $\Phi$ is represented by D sets of two-dimensional feature vectors, the MPS is represented by D wings of tensors, and each wing is associated with one set of two-dimensional feature vectors.

In at least one embodiment, the D extra tensors in the MPS having a physical dimension of size M are central tensors in the MPS.

In at least one embodiment, each fitting function is determined using tensor network support vector regression.

In at least one embodiment, each fitting function is determined using support vector regression (SVR) in combination with tensor network (TN) decompositions.

In at least one embodiment, the method further comprises flattening the MPS model by cutting a virtual bond between neighboring tensors.

In at least one embodiment, the cost function is a log-cosh cost function.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 3 shows a diagram of an example of a 2-dimensional MPS model.

Figure 1:
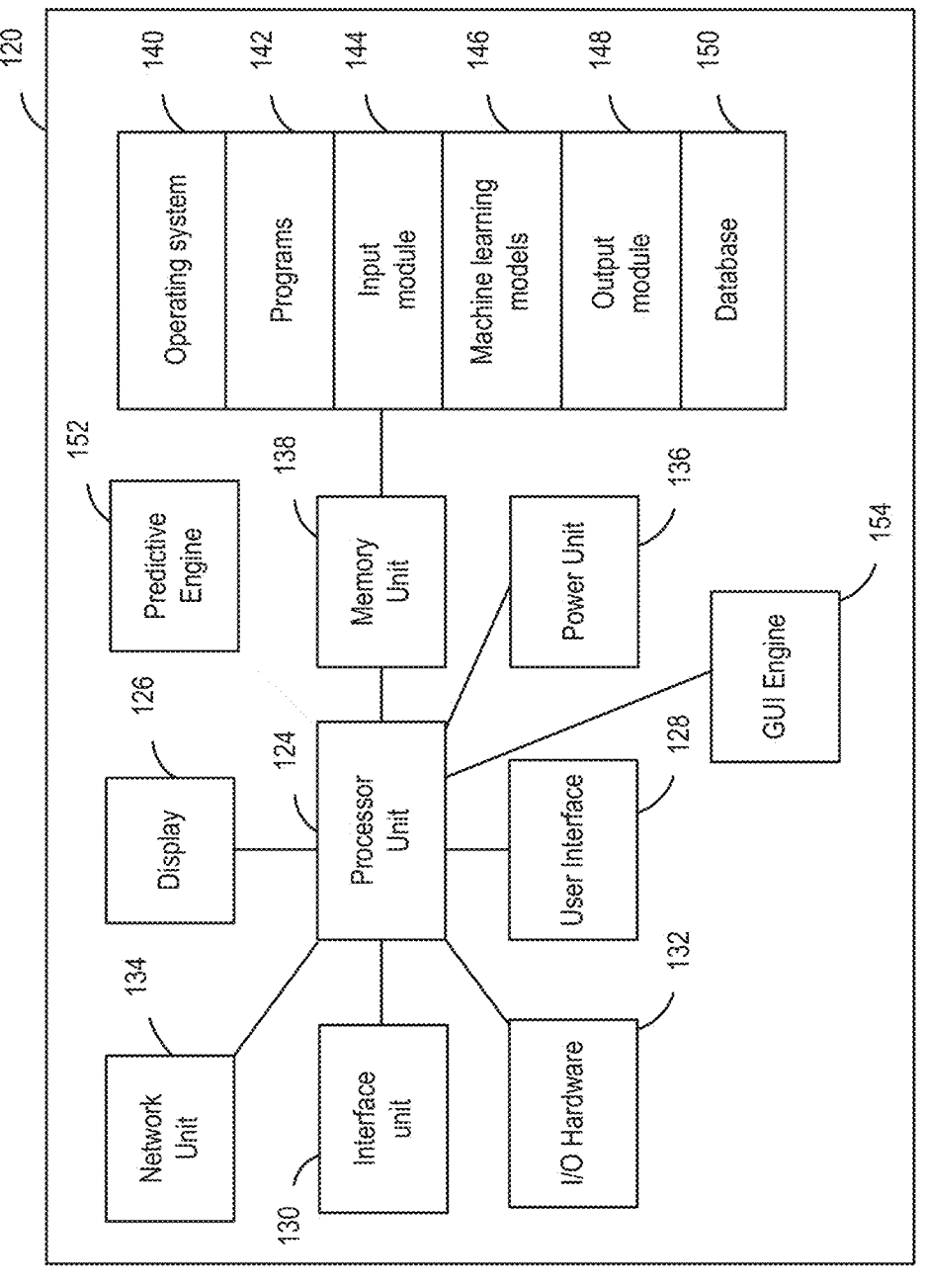
FIG. 1 shows a block diagram of an example embodiment of a system for applying matrix product states to machine learning.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in $C^{++}$, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments of systems and methods for applying matrix product states to machine learning, and computer products for use therewith.

At least some of the embodiments described herein may have applications in an electrical grid, an electricity network (e.g., of a building, of a street, of a neighborhood, etc.), a portfolio of financial assets or derivatives, a stock market, a system of devices and/or machines (e.g., of a factory, of an industrial installation, etc.), or a set of patients of a hospital unit (e.g., intensive care unit, non-intensive care unit, etc.).

By way of example, in the case of an electrical grid or electricity network, the systems and methods described herein may provide data for optimization of the energy markets offered, or for predictive maintenance of the different devices of the grid/network. In a stock market application, the systems and methods described herein may predict the evolution of the stock market, and in a portfolio of financial assets or derivatives, the systems and methods described herein may optimize portfolios or provide data for pricing or deep hedging. When the embodiments described herein are used in devices and/or machines, the systems and methods described herein may determine whether the system is functioning correctly, and/or whether predictive maintenance needs to be conducted because a device/machine might stop working and, where patients are concerned, the system may predict the evolution of the patients.

For instance, the set of data used may be measurements from a plurality of measurements of the devices and/or machines of the system that measured the behavior thereof, or measurements of the patients (with, e.g., biosensors). The systems and methods described herein may then provide, for instance, a condition or characteristic of the system indicative of whether a device or machine is expected to malfunction, or indicative of whether a patient is expected to have a seizure or crisis.

1. Overview

Tensor networks have proven capable of serving as machine learning (ML) architectures performing tasks such as classification and generative modeling. The Matrix Product State (MPS), in particular, is one of the simplest architectures showing great performance in various ML tasks. The embodiments of the invention as described herein provide applications of the MPS to regression and solving Ordinary Differential Equations (ODEs). In at least one embodiment, the MPS can outperform Neural Networks (NNs) in such tasks in terms of the convergence speed of the loss function.

Basic Definitions

Tensor: A multidimensional array of complex numbers.

Bond dimension: Size of the dimensions of the tensors which is categorized into two families: (a) virtual dimension which controls the correlation between data; and (b) physical dimension which is the size of the input and output of neurons in each NN layer.

Matrix product state (MPS): Tensor (e.g., a rank-3 tensor) widely used in algorithms for finding the ground state of a physical system, such as a Density Matrix Renormalization Group (DMRG).

Matrix product operator (MPO): Tensor (e.g., a rank-4 tensor) with (two) physical dimensions and (two) virtual dimensions which are used as a replacement for weights in a NN.

Tensor network diagram: Graphical notation in which each tensor is replaced by an object (e.g., circle, square) and its dimensions are denoted by links (e.g., legs) connected to the object.

Tensor contraction: (Multiplication of tensors along their shared dimension (e.g., summation over shared indices of the tensors).

Reference is first made to FIG. 1, showing block diagram of an example embodiment of system 100 for applying matrix product states to machine learning. The system 100 includes at least one server 120. The server 120 may communicate with one or more user devices (not shown), for example, wirelessly or over the Internet. The system 100 may also be referred to as a machine learning system when used as such.

The user device may be a computing device that is operated by a user. The user device may be, for example, a smartphone, a smartwatch, a tablet computer, a laptop, a virtual reality (VR) device, or an augmented reality (AR) device. The user device may also be, for example, a combination of computing devices that operate together, such as a smartphone and a sensor. The user device may also be, for example, a device that is otherwise operated by a user, such as a drone, a robot, or remote-controlled device; in such a case, the user device may be operated, for example, by a user through a personal computing device (such as a smartphone). The user device may be configured to run an application (e.g., a mobile app) that communicates with other parts of the system 100, such as the server 120.

The server 120 may run on a single computer, including a processor unit 124, a display 126, a user interface 128, an interface unit 130, input/output (I/O) hardware 132, a network unit 134, a power unit 136, and a memory unit (also referred to as "data store") 138. In other embodiments, the server 120 may have more or less components but generally function in a similar manner. For example, the server 120 may be implemented using more than one computing device.

The processor unit 124 may include a standard processor, such as the Intel Xeon processor, for example. Alternatively, there may be a plurality of processors that are used by the processor unit 124, and these processors may function in parallel and perform certain functions. The display 126 may be, but not limited to, a computer monitor or an LCD display such as that for a tablet device. The user interface 128 may be an Application Programming Interface (API) or a web-based application that is accessible via the network unit 134. The network unit 134 may be a standard network adapter such as an Ethernet or 802.11x adapter.

The processor unit 124 may execute a predictive engine 152 that functions to provide predictions by using machine learning models 146 stored in the memory unit 138. The predictive engine 152 may build a predictive algorithm through machine learning. The training data may include, for example, image data, video data, audio data, and text.

The processor unit 124 can also execute a graphical user interface (GUI) engine 154 that is used to generate various GUIs. The GUI engine 154 provides data according to a certain layout for each user interface and also receives data input or control inputs from a user. The GUI then uses the inputs from the user to change the data that is shown on the current user interface, or changes the operation of the server 120 which may include showing a different user interface.

The memory unit 138 may store the program instructions for an operating system 140, program code 142 for other applications, an input module 144, a plurality of machine learning models 146, an output module 148, and a database 150. The machine learning models 146 may include, but are not limited to, image recognition and categorization algorithms based on deep learning models and other approaches. The database 150 may be, for example, a local database, an external database, a database on the cloud, multiple databases, or a combination thereof.

In at least one embodiment, the machine learning models 146 include a combination of convolutional and recurrent neural networks. Convolutional neural networks (CNNs) are designed to recognize images, patterns. CNNs perform convolution operations, which, for example, can be used to classify regions of an image, and see the edges of an object recognized in the image regions. Recurrent neural networks (RNNs) can be used to recognize sequences, such as text, speech, and temporal evolution, and therefore RNNs can be applied to a sequence of data to predict what will occur next. Accordingly, a CNN may be used to read what is happening on a given image at a given time, while an RNN can be used to provide an informational message.

The programs 142 comprise program code that, when executed, configures the processor unit 124 to operate in a particular manner to implement various functions and tools for the system 100.

2. Matrix Product State

A matrix product state (MPS) can be represented as a type of 1-dimensional tensor network, which has widely been used in condensed matter physics. An MPS can be applied to machine learning (ML), such as for image classification. In the embodiments of the invention described herein, which considers regression and solving ODEs, an MPS architecture as shown in FIG. 2 may be used.

Figure 2:
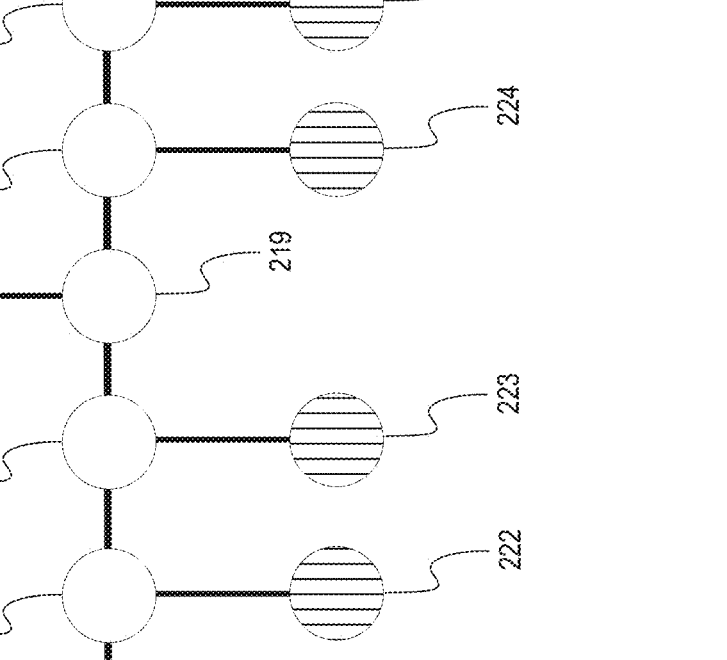
FIG. 2 shows a diagram of an example of a 1-dimensional MPS model.

FIG. 2 shows a diagram of an example of a 1-dimensional MPS model 200. A first set of nodes (shown in FIG. 2 as unfilled circles) represents the MPS tensors 211 to 216 containing trainable parameters of the model, with bonds 270 between neighboring nodes being hyperparameters controlling the total number of trainable parameters. A second set of nodes (shown in FIG. 2 as circles filled with a vertical line pattern) represents 2-dimensional vectors 221 to 226 of feature-mapped input data, which takes the form of [x, 1−x], where x is the value of the data. Full contraction of the architecture then yields an output vector containing values dependent on the problem of interest. In what follows, it can generally be assumed that the function to be fit is 1-dimensional, e.g., $f(x)$ with x being a real number. This, however, can be generalized to higher-dimensional functions.

3. Application to Regression

One approach is to use the same technology used for Support Vector Machines (SVMs) but for regressions, which is called Support Vector Regression (SVR), using TN decompositions. Suppose there is a set of datapoints $y_i$ for some real input values $x_i$ (i.e., assume a function with a 1-dimensional real domain having pairs $(y_i, x_i)$). Assume there is N input data, i.e., i=1, 2, . . . , N. Separate this data in $N_b$ batches of M points, so that $N_b \times M=N$. One can minimize the log-cosh cost function for each batch alpha ($\alpha$) as follows:

$$L_\alpha = \sum_{i=1, i \in \alpha}^{N_b} \log(\cosh(f(x_i) - y_i))$$

The fitting function is $f(x)$ and is such that its parameters will minimize the log-cosh error with respect to all the batches:

$$\min_f \sum_\alpha L_\alpha$$

The fitting function can be found via SVR in combination with TNs. For this, recall that in SVRs, as in SVMs, one can describe a function as:

$$f(x)=\Phi \cdot W$$

with W being a "weight vector" and $\Phi$ being a "feature map". One can use TN-SVRs to decompose the above product following the notation represented in FIG. 2, with the MPS tensors 211 to 216 being an MPS decomposition of W, and the feature map being local and represented by 2-dimensional vectors [x, 1−x].

One can train the MPS (as shown in FIG. 2) to minimize the total error over all the batches as described above. This can be done by choosing an MPS with M+1 tensors, such that: (1) all tensors except one (with a free index) correspond to one data point t in the batch, and the associated feature vector is [$x_t$, 1−$x_t$]; and (2) one extra tensor in the MPS, such as the central one (shown as MPS tensor 219 in FIG. 2), has a physical dimension of size M, and corresponds to the number of possible outputs for a given batch.

One can optimize the coefficients of the tensors in the MPS to minimize the log-cosh error function, sequentially over all the batches. One epoch of training includes a sweep over all batches. This strategy may dramatically reduce the number of parameters in the fitted function (e.g., with respect to neural networks of TN-Neural Networks) and also converges faster in terms of the number of epochs (see Experimental Results below).

The optimization scheme of the MPS tensors can be the standard auto-differentiation and back-propagation in ML, with the loss function being log-cosh loss, which is found to be efficient for regression. In comparison with a NN model with comparable parameters, the MPS model shows a loss convergence requiring 8-10 times fewer epochs. Alternative optimization methods for the MPS tensors include: (a) DMRG-like variational sweeps over the tensors; and (b) tangent-space variational methods.

4. Application to Solving ODEs

Solving ODEs is a natural extension of the regression application. An ordinary differential equation (ODE) is typically of the form $$\mathcal{L}[f(x)]=g(x)$$

with $f(x)$ the solution and $\mathcal{L}$ some operator. The procedure to solve the ODE above via regression is the same as described above, which can be thought of as trying to fit (x) via $\mathcal{L}[f(x)]$. In this way, everything proceeds in the same way, with the error for batch alpha ($\alpha$) being $$L_\alpha = \sum_{i=1, i \in \alpha}^{N_b} \log(\cosh(\mathcal{L}[f(x_i)] - g(x_i)))$$

where in $\mathcal{L}[f(x_i)]$, one preferably takes an appropriate discretization of derivative operators. In comparison with a NN model with comparable parameters, the MPS model again shows a faster loss convergence (see Experimental Results below).

4.1 Extension to 2-Dimensional Functions

FIG. 3 shows a diagram of an example of a 2-dimensional MPS model 300. The architecture in FIG. 2, with some modifications as shown in FIG. 3, can be readily scaled up for higher-dimension regression problems. For 2-dimensional cases, the target function is $f(x, y)$ The left wing of nodes (i.e., MPS tensors 311 to 313) takes the input of x values, and the right wing of nodes (i.e., MPS tensors 331 to 333) takes the input of y values. Full contraction of the whole architecture yields two output vectors representing the fitted (predicted) x and y values for the target function.

A second set of nodes (shown in FIG. 3 as circles filled with a vertical line pattern) on the left wing represents 2-dimensional vectors 321 to 323 of feature-mapped input data, which takes the form of [x, 1−x], where x is the value of the data. A second set of nodes (shown in FIG. 3 as circles filled with a vertical line pattern) on the right wing represents 2-dimensional vectors 341 to 343 of feature-mapped input data, which takes the form of [y, 1−y], where y is the value of the data. Bonds 370 between neighboring nodes are hyperparameters controlling the total number of trainable parameters.

The fitting function can be found via SVR in combination with TNs. Again, one can describe a function as:

$$f(x,y)=\Phi \cdot W$$

with W being a "weight vector" and being a "feature map". One can use TN-SVRs to decompose the above product following the notation represented in FIG. 3, with the MPS tensors 311 to 313 (on the left wing) and the MPS tensors 331 to 333 (on the right wing) being an MPS decomposition of W, and the feature map being local and represented by 2-dimensional vectors [x, 1−x] for the left wing and [y, 1−y] for the right wing.

One can train the MPS (as shown in FIG. 3) to minimize the total error over all the batches as described above. This can be done by choosing an MPS with M+2 tensors, such that: (1) all tensors except two (with a free index) correspond to one data point i in the batch, and the associated feature vector is [$x_i$, 1−$x_i$] for the left wing and [$y_i$, 1−$y_i$] for the right wing; and (2) two extra tensors in the MPS, such as the central ones (shown as MPS tensors 319 and 339 in FIG. 3), have a physical dimension of size M, and correspond to the number of possible outputs for a given batch.

The results (see Experimental Results below) show that for the case of separable functions, the advantage over NN in loss convergence is still significant. For non-separable functions, however, such an advantage becomes less pronounced.

4.2 Extension to 3-Dimensional Functions

One can also consider other possible architectures for higher-dimensional functions. For instance, for the 3-dimensional case, one can take options such as those shown in FIG. 4.

Figure 4:
FIG. 4 shows a diagram of an example of a 3-dimensional MPS model.

FIG. 4 shows a diagram of an example of a 3-dimensional MPS model 400. For 3-dimensional cases, the target function is $f(x, y, z)$. The upper left wing of nodes (i.e., MPS tensors 411 to 413) takes the input of x values, the upper right wing of nodes (i.e., MPS tensors 431 to 433) takes the input of y values, and the lower wing of nodes (i.e., MPS tensors 451 to 453) takes the input of z values. Full contraction of the whole architecture yields two output vectors representing the fitted (predicted) x, y, and z values for the target function.

A second set of nodes (shown in FIG. 4 as circles filled with a vertical line pattern) on the upper left wing represents 2-dimensional vectors 421 to 423 of feature-mapped input data, which takes the form of [x, 1−x], where x is the value of the data. A second set of nodes (shown in FIG. 4 as circles filled with a vertical line pattern) on the upper right wing represents 2-dimensional vectors 441 to 443 of feature-mapped input data, which takes the form of [y, 1−y], where y is the value of the data. A second set of nodes (shown in FIG. 4 as circles filled with a vertical line pattern) on the lower wing represents 2-dimensional vectors 461 to 463 of feature-mapped input data, which takes the form of [z, 1−z], where z is the value of the data. Bonds 470 between neighboring nodes are hyperparameters controlling the total number of trainable parameters.

The fitting function can be found via SVR in combination with TNs. Again, one can describe a function as:

$$f(x,y,z)=\Phi \cdot W$$

with W being a "weight vector" and $\Phi$ being a "feature map". One can use TN-SVRs to decompose the above product following the notation represented in FIG. 4, with the MPS tensors 411 to 413 (on the upper left wing), the MPS tensors 431 to 433 (on the upper right wing), and the MPS tensors 451 to 453 (on the lower wing) being an MPS decomposition of W, and the feature map being local and represented by 2-dimensional vectors [x, 1−x] for the upper left wing, [y, 1−y] for the upper right wing, and [z, 1−z] for the lower wing.

One can train the MPS (as shown in FIG. 4) to minimize the total error over all the batches as described above. This can be done by choosing an MPS with M+3 tensors, such that: (1) all tensors except two (with a free index) correspond to one data point i in the batch, and the associated feature vector is $[x_i, 1−x_i]$ for the upper left wing, $[y_i, 1−y_i]$ for the upper right wing, and $[z_i, 1−z_i]$ for the lower wing; and (2) three extra tensors in the MPS, such as the central ones (shown as MPS tensors 419, 439, and 459 in FIG. 4), have a physical dimension of size M, and correspond to the number of possible outputs for a given batch.

4.3 Cutting Loops for Efficiency

Figure 5:
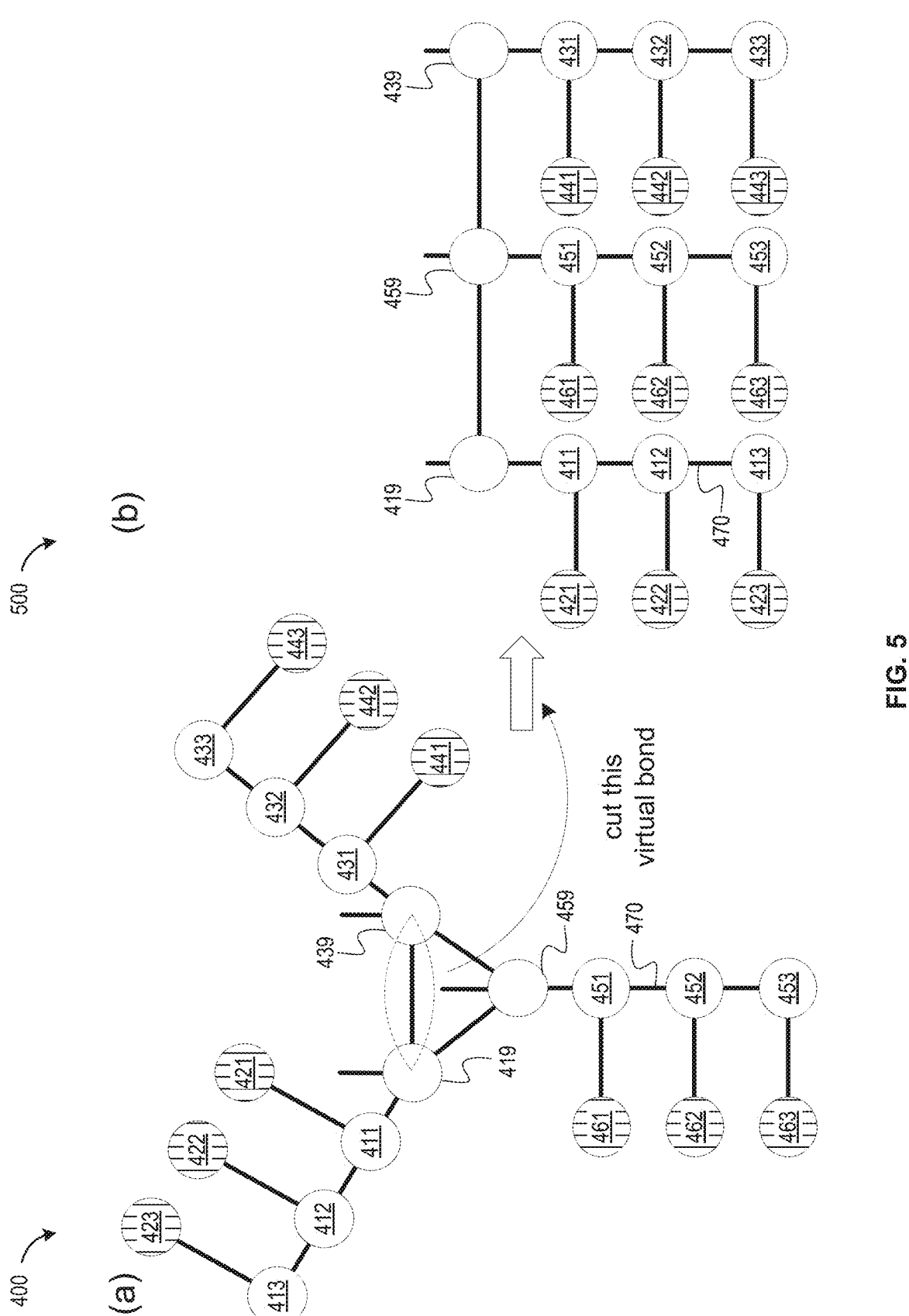
FIG. 5 shows an example of the 3-dimensional MPS model.

Efficiency can be further enhanced by cutting loops in the TN, considering structures such as the one shown in FIG. 5.

FIG. 5 shows an example of the 3-dimensional MPS model 400 of FIG. 4 being converted into a "flattened" 3-dimensional MPS model 500. As shown in FIG. 5:

(a) Before flattening, the 3-dimensional MPS model 400 has bonds between each of the central MPS tensors 419, 439, and 459.

(b) After flattening, the "flattened" 3-dimensional MPS model 500 has bonds (i) between central MPS tensors 419 and 459 and (ii) between central MPS tensors 459 and 439. This can be achieved by cutting the virtual bond between central MPS tensors 419 and 439.

Cutting the loops in the TN allows for faster and more efficient training schemes, but results also in less correlated outcomes of the regressor.

5. Application to Technical Problems

The embodiments of the invention described herein can be applied to improve the memory, precision, and speed of any regression algorithm. It can therefore be linked to prediction problems as well as ODE solutions. It can be used for instance to implement stock market prediction, forecasting, portfolio optimization, scoring, rating, solutions of partial differential equations in engineering and financial problems (as in pricing), and more.

Figure 6:
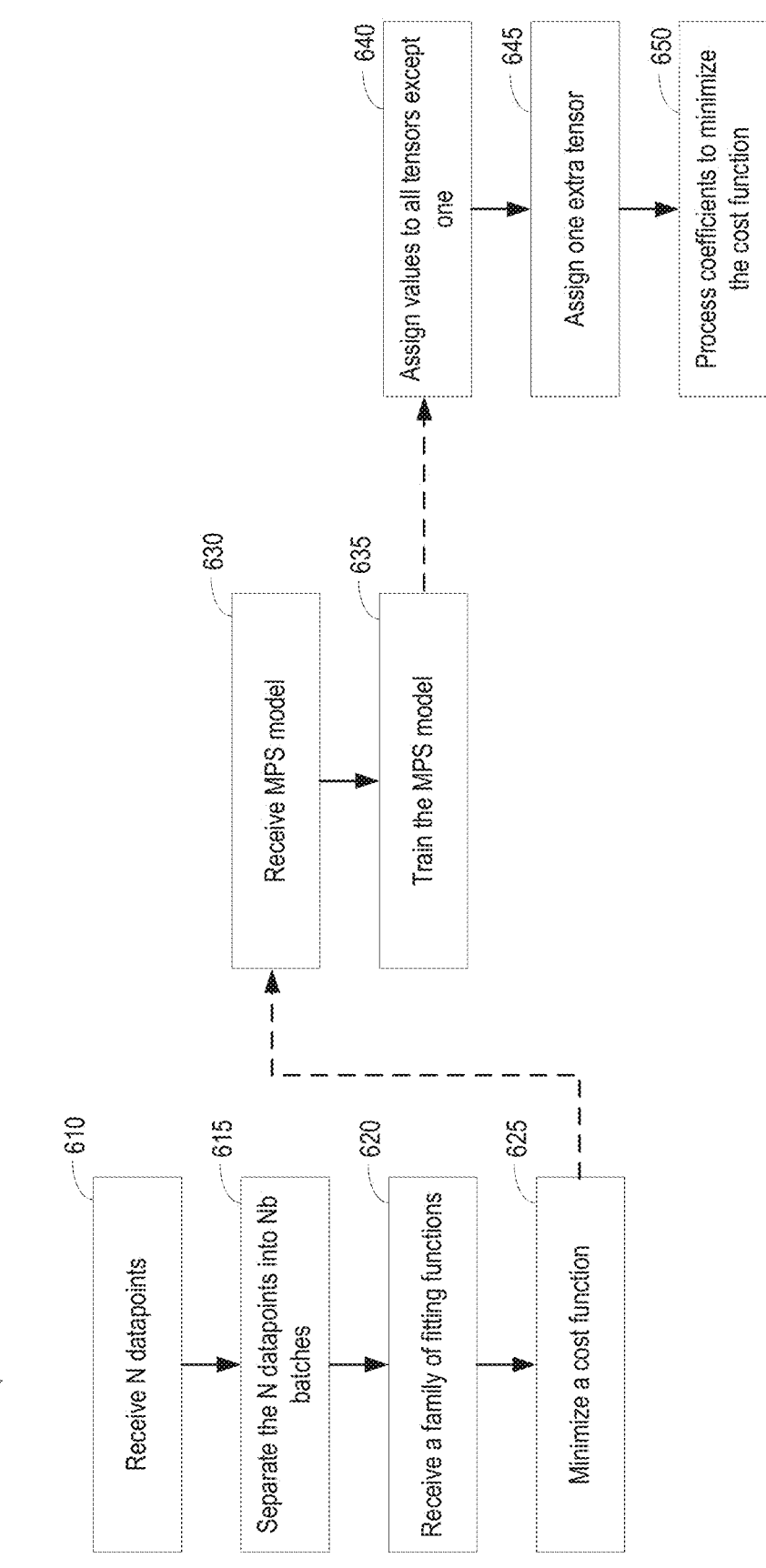
FIG. 6 shows a flow chart of an example method of applying non-linear regression using an MPS model.

FIG. 6 shows a flow chart of an example method 600 of applying non-linear regression using an MPS model. The method 600 may be used by system 106. The method 600 may be used on a set of data points to get an estimate.

At 610, the system 100 receives a set of N datapoints, each of the datapoints having associated input values.

At 615, the system 100 separates the set of N datapoints into $N_b$ batches, each of the $N_b$ batches having $M=N/N_b$ datapoints.

At 620, the system 100 receives a family of fitting functions, each function comprising a dot product of a feature map $\Phi$ with a weight vector W, where the feature map $\Phi$ is local and represented by feature vectors having at least two dimensions. For example, for a one-dimensional non-linear regression problem, the feature map $\Phi$ may be represented by two-dimensional feature vectors [x, 1−x].

At 625, the system 100 minimizes a cost function for each batch $\alpha$. For example, the system 100 can minimize a log-cosh cost function for each batch $\alpha$ by selecting parameters for the functions that minimize the log-cosh cost function. The parameters may be obtained using an MPS model as shown below from 630 to 635.

At 630, the system 100 receives a matrix product state (MPS) model providing an MPS representation of the weight vector W, the MPS model comprising tensors. The tensors may be referred to as "weight tensors".

At 635, the system 100 trains the MPS model to minimize loss over all the $N_b$ batches, the training comprising choosing an MPS model with M+D tensors, each of the tensors having respective coefficients to minimize the cost function. The system 100 may include actions to train the MPS model as shown below from 640 to 650.

At 640, the system 100 assigns values to all of the tensors except D, where D is the dimension of the target function to correspond to one datapoint i in each of the $N_b$ batches. For a one-dimensional non-linear regression problem, the system 100 assigns values to all of the tensors except one to correspond to one datapoint i in each of the $N_b$ batches with associated feature vectors being $[x_i, 1−x_i]$.

At 645, the system 100 assigns D extra tensors in the MPS with a physical dimension of size M corresponding to the number of possible outputs for a given batch from the $N_b$ batches.

At 650, the system 100 processes the coefficients of the tensors in the MPS so that they minimize the cost function sequentially over all the $N_b$ batches.

6. Experimental Results

Experiments were run to evaluate regressions of the functions sin(13x) and x cos(15)x on three models: (a) an artificial neural network with 3 hidden layers (NN3), (b) a tensorial neural network (TNN), and (c) a matrix product state (MPS) consistent with the teachings herein. The number of points N=1000. The noise level sigma σ=0.2. The training data was obtained from np.linspace(0.0, 1.0, N). The test data was obtained from np.linspace(0.1005, 1.1005, N). The batch size bs=50. The loss evaluated was the log-cosh loss.

Figure 7:
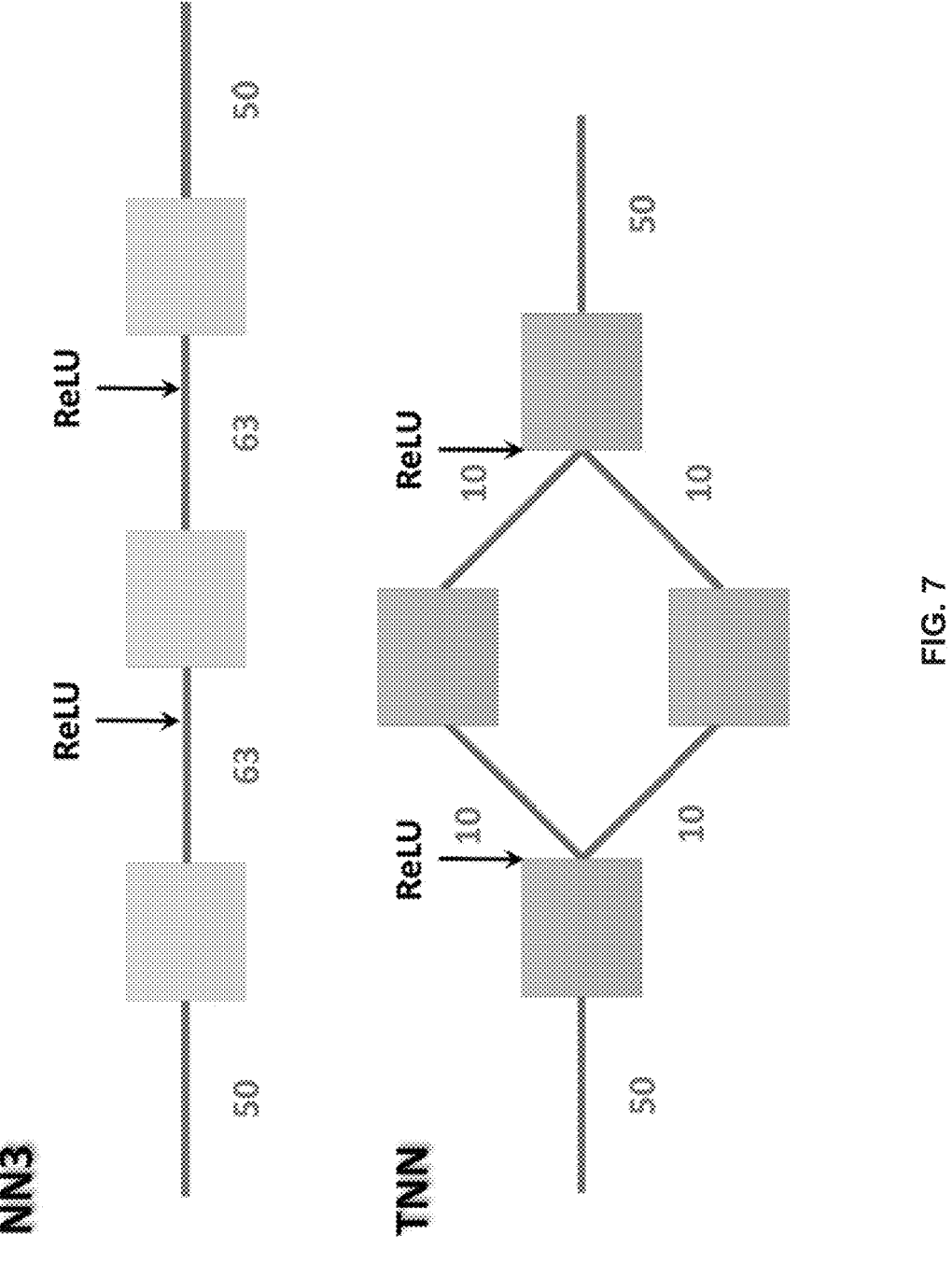
FIG. 7 shows a setup for a NN3 model and a TNN model used to obtain experimental results.

FIG. 7 shows the setup for an NN3 model and a TNN model. The batch size for both models was bs=50. The NN3 model had bond values of 50, 63, 63, and 50, using the ReLU activation function between the nodes having bond values of 63 separating them. The parameter count for the NN3 was 10445. The TNN model had bond values of 50, 10, 10, 10, 10, and 50, using the ReLU activation function between the nodes having bond values of 10 separating them. The parameter count for the TNN was 10350.

Figure 8:
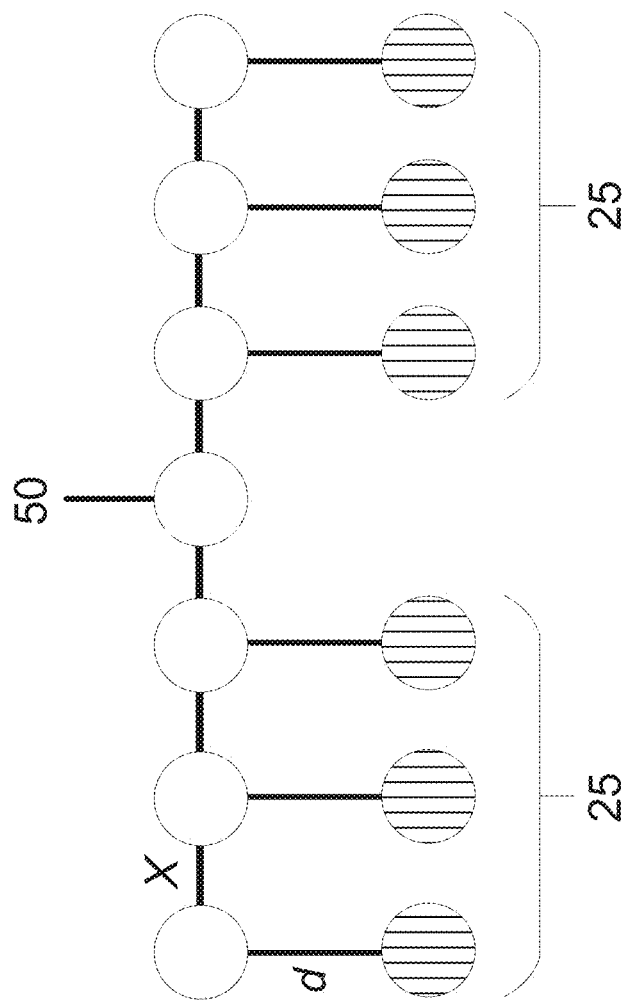
FIG. 8 shows a setup for an MPS model used to obtain experimental results.

FIG. 8 shows the setup for the MPS model. The batch size for the MPS model was bs=50. The MPS model had MPS tensors with bonds X=8 between them. The tensors (shown as empty circles) and the vectors (shown as circles filled in with a vertical line pattern) had bonds d between them. The extra tensor had a physical dimension of size M=50. The tensors on each side of the extra tensor were of size 25 each. The feature map for the vectors was given by (x, 1–x). The parameter count was 9376.

Figures 9, 10:
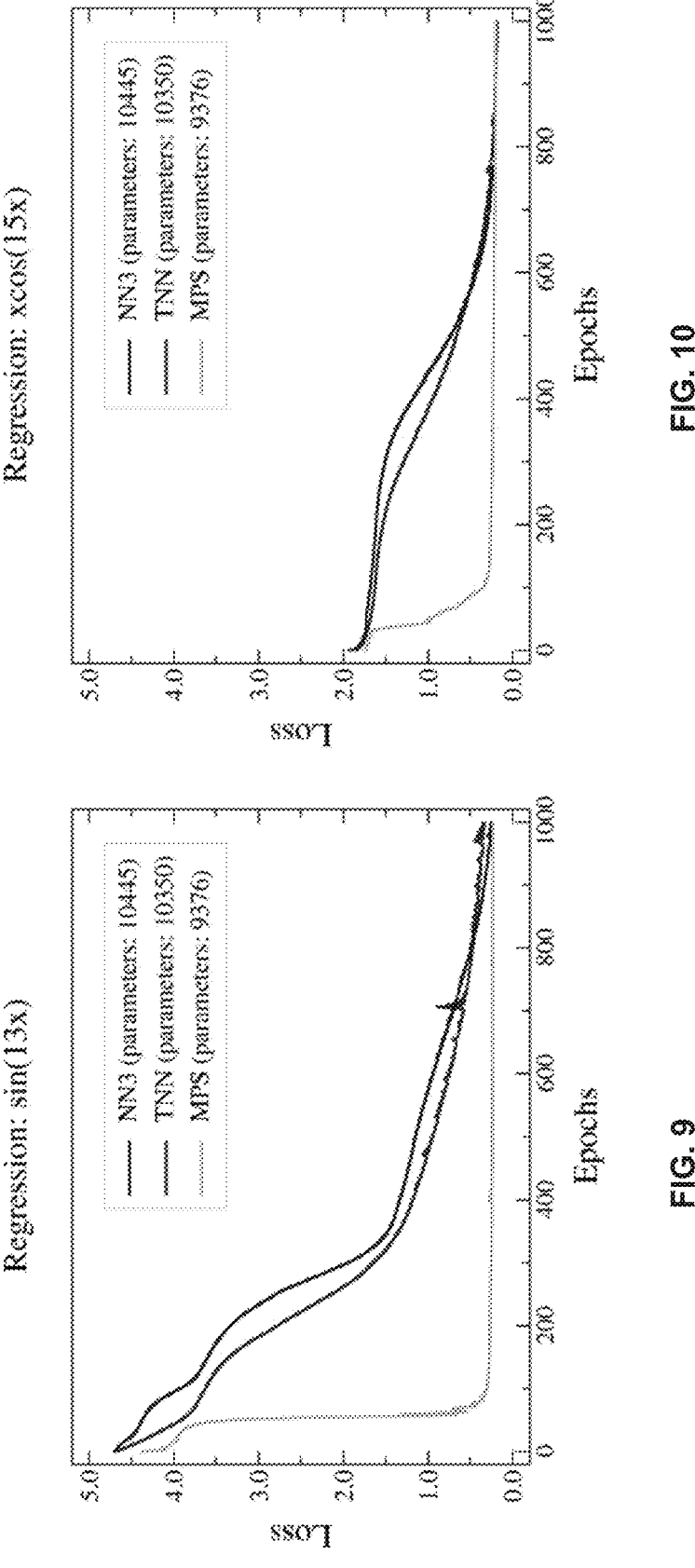
FIG. 9 shows a graph for the regression of the sin(13x) function.
FIG. 10 shows a graph for the regression of the x cos(15x) function.

FIG. 9 shows the graph for the regression of the sin(13x) function, plotting loss (log-cosh) against number of epochs. For this graph, N=1000, σ=0.2, bs=50, and lr=0.001. The optimizer used was Adam.

FIG. 10 shows the graph for the regression of the x cos(15x) function, plotting loss (log-cosh) against number of epochs. For this graph, N=1000, σ=0.2, bs=50, and lr=0.001. The optimizer used was Adam.

Figures 11, 12:
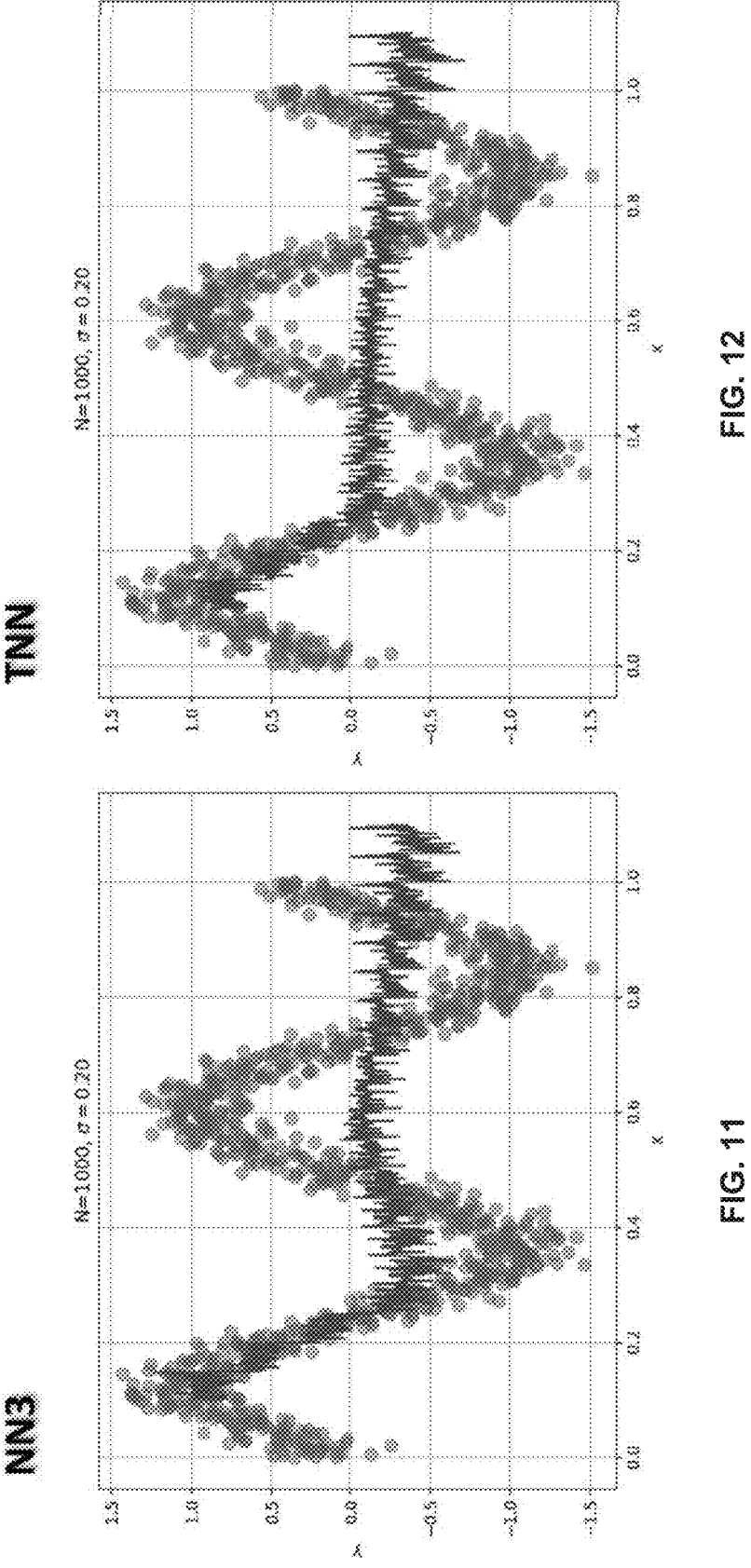
FIG. 11 shows a graph for fitting the sin(13x) function by the NN3 model with 200 epochs.
FIG. 12 shows a graph for fitting the sin(13x) function by the TNN model with 200 epochs.

FIG. 11 shows the graph for fitting the sin(13x) function by the NN3 model for N=1000 and σ=0.2, with the number of epochs equal to 200.

FIG. 12 shows the graph for fitting the sin(13x) function by the TNN model for N=1000 and σ=0.2, with the number of epochs equal to 200.

Figure 13:
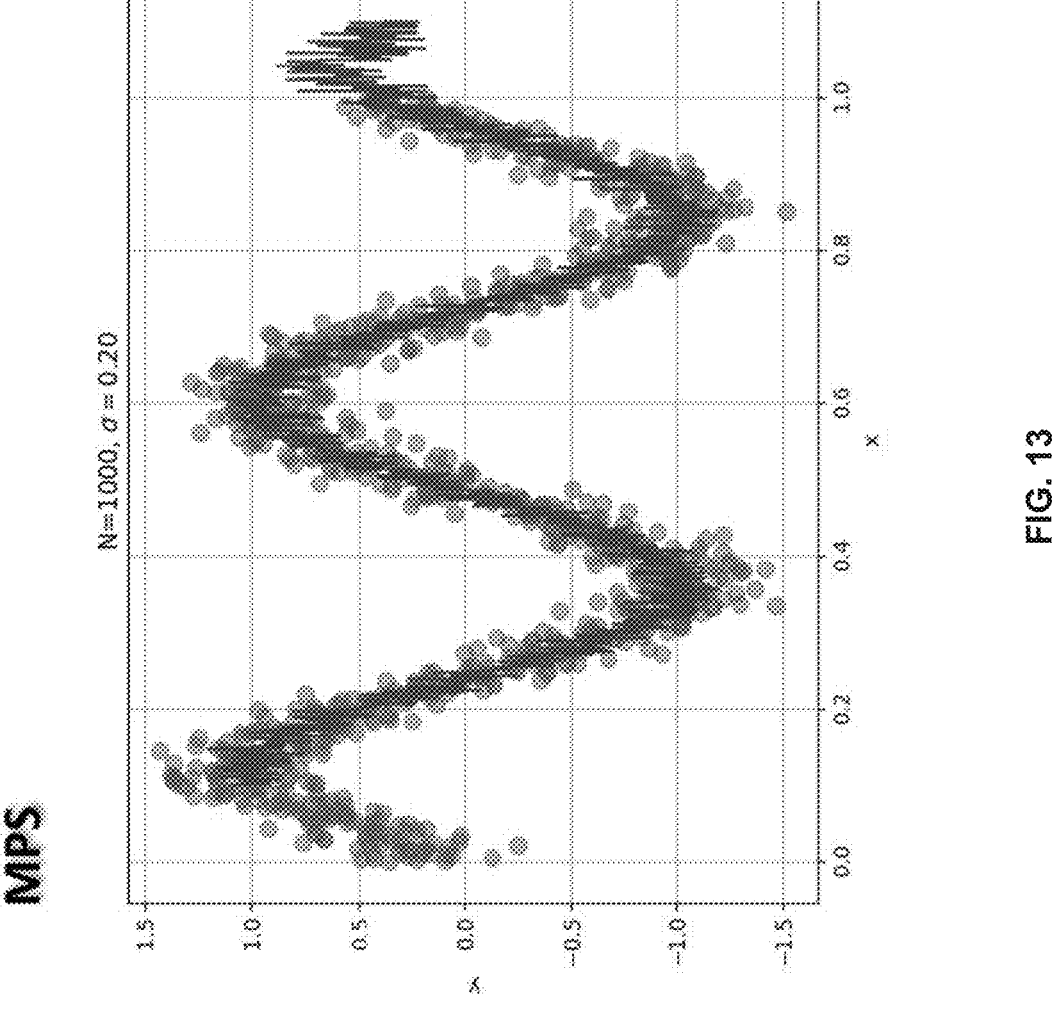
FIG. 13 shows a graph for fitting the sin(13x) function by the MPS model with 200 epochs.

FIG. 13 shows the graph for fitting the sin(13x) function by the MPS model for N=1000 and σ=0.2, with the number of epochs equal to 200.

Figures 14, 15:
FIG. 14 shows a graph for fitting the sin(1.3x) function by the NN3 model with 1000 epochs.
FIG. 15 shows a graph for fitting the sin(13x) function by the TNN model with 1000 epochs.

FIG. 14 shows the graph for fitting the sin(13x) function by the NN3 model for N=1000 and σ=0.2, with the number of epochs equal to 1000.

FIG. 15 shows the graph for fitting the sin(13x) function by the TNN model for N=1000 and σ=0.2, with the number of epochs equal to 1000.

Figures 16, 17:
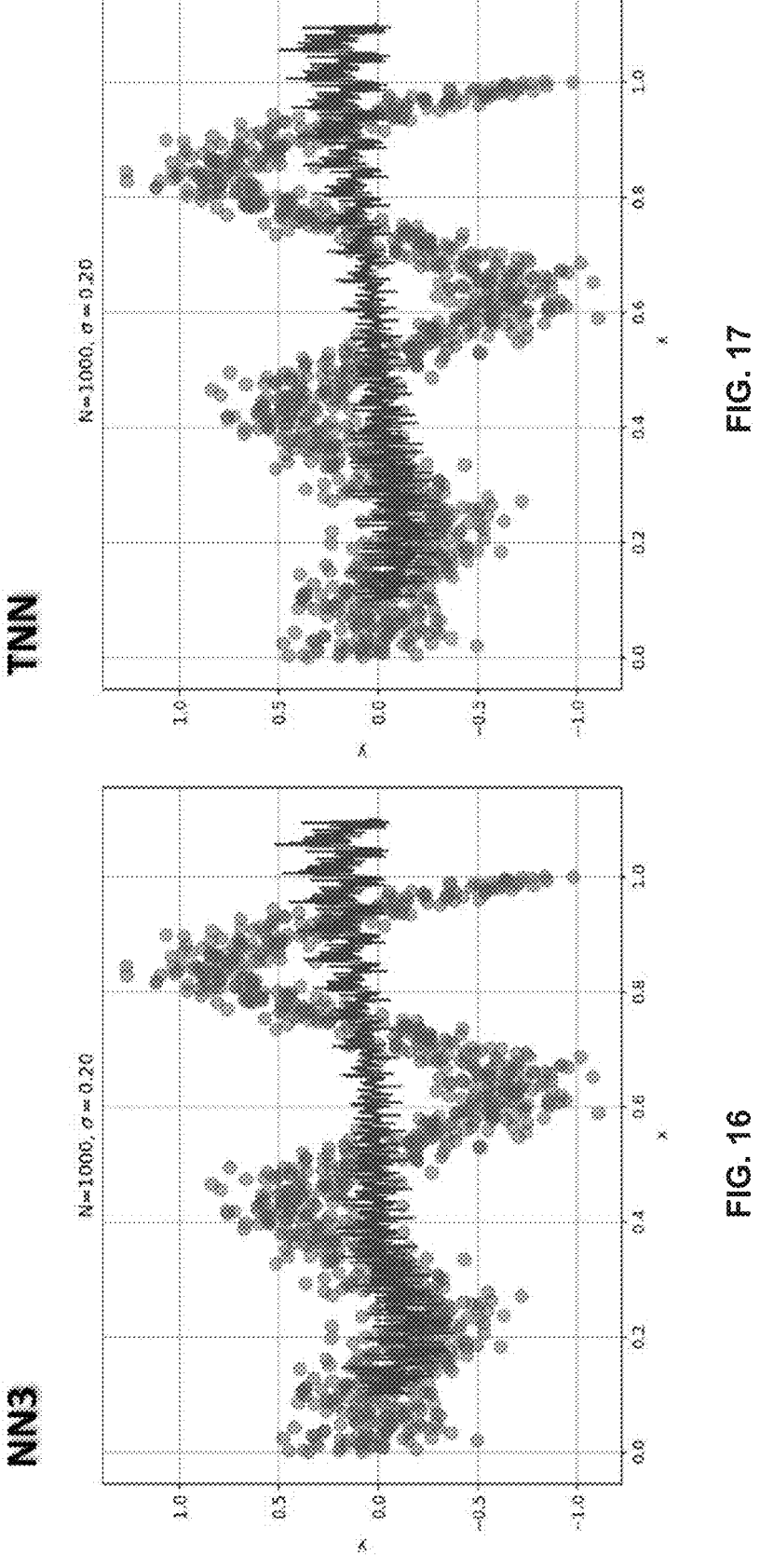
FIG. 16 shows a graph for fitting the x cos(15x) function by the NN3 model with 200 epochs.
FIG. 17 shows a graph for fitting the x cos(15x) function by the TNN model with 200 epochs.

FIG. 16 shows the graph for fitting the x cos(15x) function by the NN3 model for N=1000 and σ=0.2, with the number of epochs equal to 200.

FIG. 17 shows the graph for fitting the x cos(15x) function by the TNN model for N=1000 and σ=0.2, with the number of epochs equal to 200.

Figure 18:
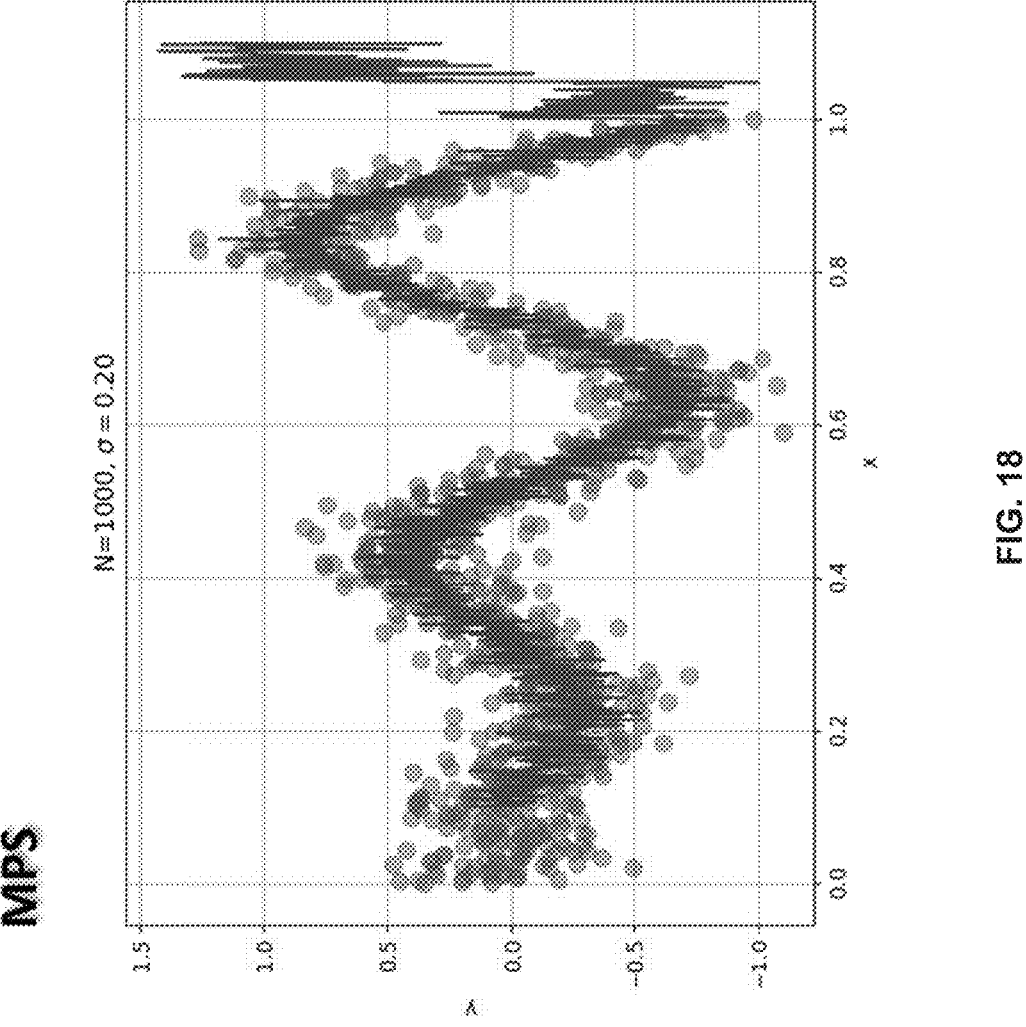
FIG. 18 shows a graph for fitting the x cos(15x) function by the MPS model with 200 epochs.

FIG. 18 shows the graph for fitting the x cos(15x) function by the MPS model for N=1000 and σ=0.2, with the number of epochs equal to 200.

Figures 19, 20:
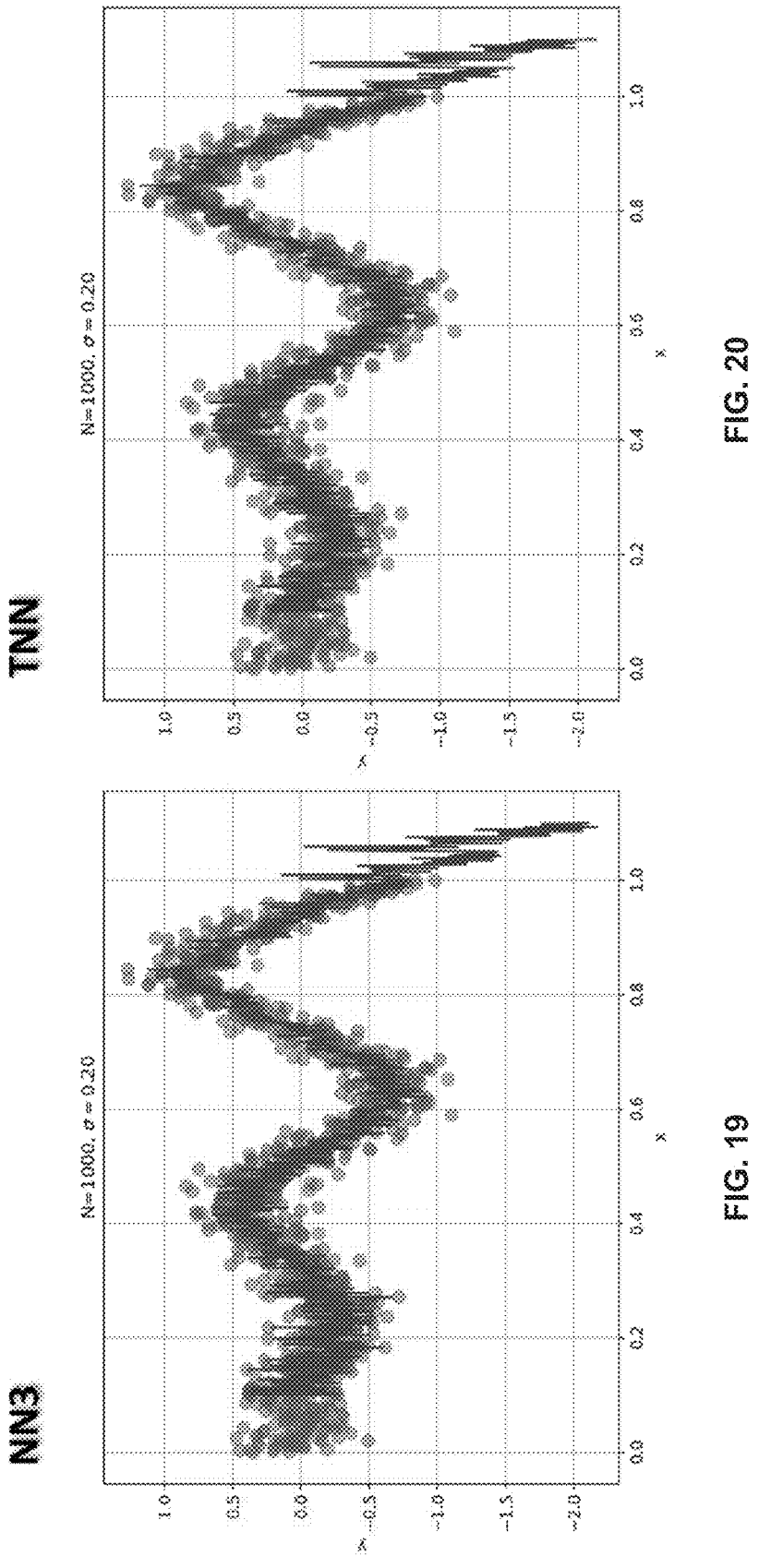
FIG. 19 shows a graph for fitting the x cos(15x) function by the NN3 model with 1000 epochs.
FIG. 20 shows a graph for fitting the x cos(15x) function by the TNN model with 1000 epochs.

FIG. 19 shows the graph for fitting the x cos(15x) function by the NN3 model for N=1000 and σ=0.2, with the number of epochs equal to 1000.

FIG. 20 shows the graph for fitting the x cos(15x) function by the TNN model for N=1000 and σ=0.2, with the number of epochs equal to 1000.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A system for applying non-linear regression on a set of N datapoints to get an estimate, the system comprising at least one processor configured to:

receive the set of N datapoints, each of the datapoints having associated input values;

separate the set of N datapoints into $N_b$ batches, each of the $N_b$ batches having M=N/$N_b$ datapoints;

receive a family of fitting functions, each function comprising a dot product of a feature map Φ with a weight vector W, where the feature map Φ is local and represented by two-dimensional feature vectors; and minimize a cost function for each of the $N_b$ batches by training a matrix product state (MPS) model to minimize loss over all the $N_b$ batches, the MPS model providing an MPS representation of the weight vector W and comprising M+D tensors, wherein D corresponds to a dimension of a target function, and wherein each of the tensors have respective coefficients, such that:

all tensors except D correspond to one datapoint i in each of the $N_b$ batches;

D extra tensors in the MPS have a physical dimension of size M corresponding to a number of possible outputs for a given batch from the $N_b$ batches; and the coefficients of the tensors in the MPS model minimize the cost function sequentially over all the $N_b$ batches.

2. The system of claim 1, wherein the at least one processor is further configured to:

decompose the weight vector W using tensor network support vector regression to obtain the weight tensors.

3. The system of claim 1, wherein the at least one processor is configured to train the MPS model to minimize loss over all the $N_b$ batches by sweeping the MPS and optimizing the coefficients of the tensors until a convergence criterion is satisfied.

4. The system of claim 3, wherein the at least one processor is configured to optimize the coefficients of the tensors using one of: auto-differentiation and back propagation, density matrix renormalization group (DMRG) variational sweep, or tangent space variational optimization.

5. The system of claim 1, wherein the feature map Φ is represented by D sets of two-dimensional feature vectors, the MPS is represented by D wings of tensors, and each wing is associated with one set of two-dimensional feature vectors.

6. The system of claim 5, wherein the D extra tensors in the MPS model having a physical dimension of size M are central tensors in the MPS model.

7. The system of claim 1, wherein each fitting function is determined using tensor network support vector regression.

8. The system of claim 1, wherein each fitting function is determined using support vector regression (SVR) in combination with tensor network (TN) decompositions.

9. The system of claim 1, wherein the at least one processor is further configured to:

flatten the MPS model by cutting a virtual bond between neighboring tensors.

10. The system of claim 1, wherein the cost function is a log-cosh cost function.

11. A computer-implemented method of applying non-linear regression on a set of N datapoints to get an estimate comprising:

receiving the set of N datapoints, each of the datapoints having associated input values;

separating the set of N datapoints into $N_b$ batches, each of the $N_b$ batches having $M=N/N_b$ datapoints;

receiving a family of fitting functions, each function comprising a dot product of a feature map $\Phi$ with a weight vector W, where the feature map $\Phi$ is local and represented by two-dimensional feature vectors; and minimizing a cost function for each of the $N_b$ batches by training a matrix product state (MPS) model to minimize loss over all the $N_b$ batches, the MPS model providing an MPS representation of the weight vector W and comprising M+D tensors, wherein D corresponds to a dimension of a target function, and wherein each of the tensors have respective coefficients, such that:

all tensors except D correspond to one datapoint i in each of the $N_b$ batches;

D extra tensors in the MPS have a physical dimension of size M corresponding to a number of possible outputs for a given batch from the $N_b$ batches; and the coefficients of the tensors in the MPS minimize the cost function sequentially over all the $N_b$ batches.

12. The method of claim 11, further comprising decomposing the weight vector W using tensor network support vector regression to obtain the weight tensors.

13. The method of claim 11, wherein training the MPS model to minimize loss over all the Ny batches comprises sweeping the MPS and optimizing the coefficients of the tensors until a convergence criterion is satisfied.

14. The method of claim 13, wherein the coefficients of the tensors are optimized using one of: auto-differentiation and back propagation, density matrix renormalization group (DMRG) variational sweep, or tangent space variational optimization.

15. The method of claim 11, wherein the feature map $\Phi$ is represented by D sets of two-dimensional feature vectors, the MPS is represented by D wings of tensors, and each wing is associated with one set of two-dimensional feature vectors.

16. The method of claim 15, wherein the D extra tensors in the MPS having a physical dimension of size M are central tensors in the MPS model.

17. The method of claim 11, wherein each fitting function is determined using tensor network support vector regression.

18. The method of claim 11, wherein each fitting function is determined using support vector regression (SVR) in combination with tensor network (TN) decompositions.

19. The method of claim 11, further comprising flattening the MPS model by cutting a virtual bond between neighboring tensors.

20. The method of claim 11, wherein the cost function is a log-cosh cost function.

* * * * *